June 2, 1953
M. W. ROSCOE ET AL
2,640,577
HOPPER AND EXTENSION CONVEYER MECHANISM
FOR SMALL GRAIN ELEVATORS
Filed Oct. 3, 1949
2 Sheets-Sheet 1
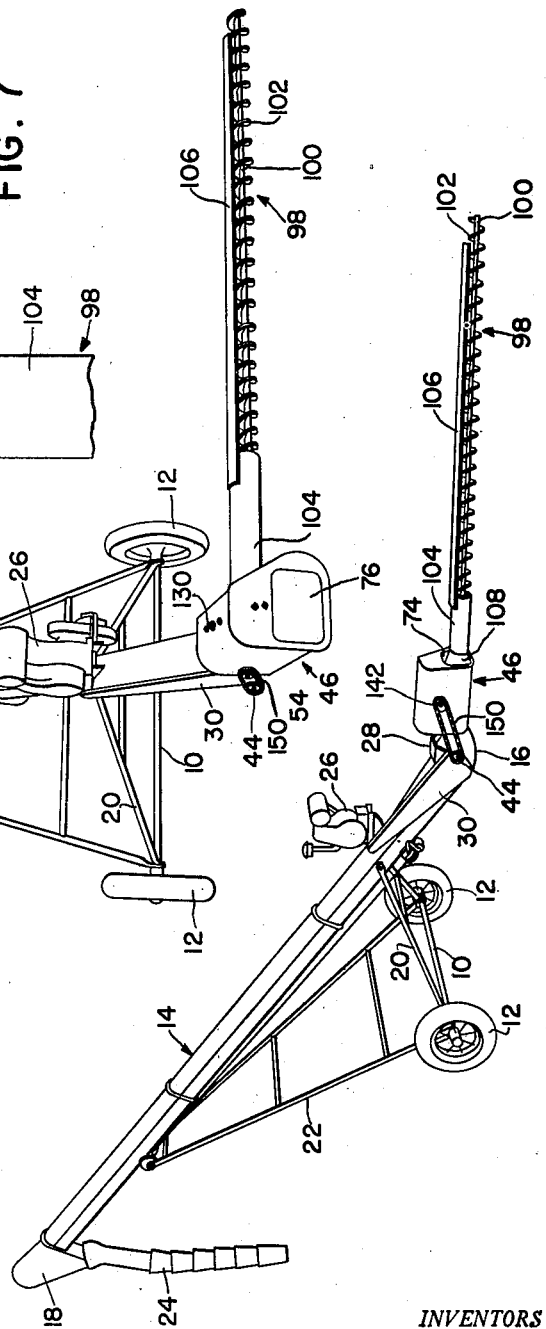
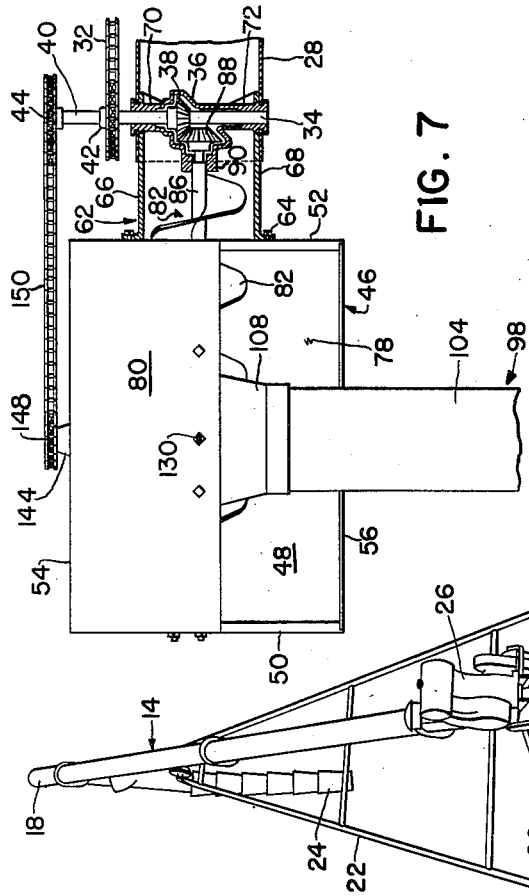
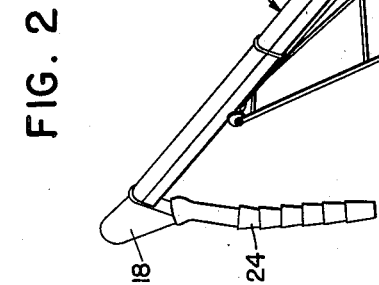
*INVENTORS*
MERRILL W. ROSCOE &
ROYAL L. BELDIN
BY
ATTORNEYS June 2, 1953 M. W. ROSCOE ET AL 2,640,577
HOPPER AND EXTENSION CONVEYER MECHANISM
FOR SMALL GRAIN ELEVATORS
Filed Oct. 3, 1949 2 Sheets-Sheet 2
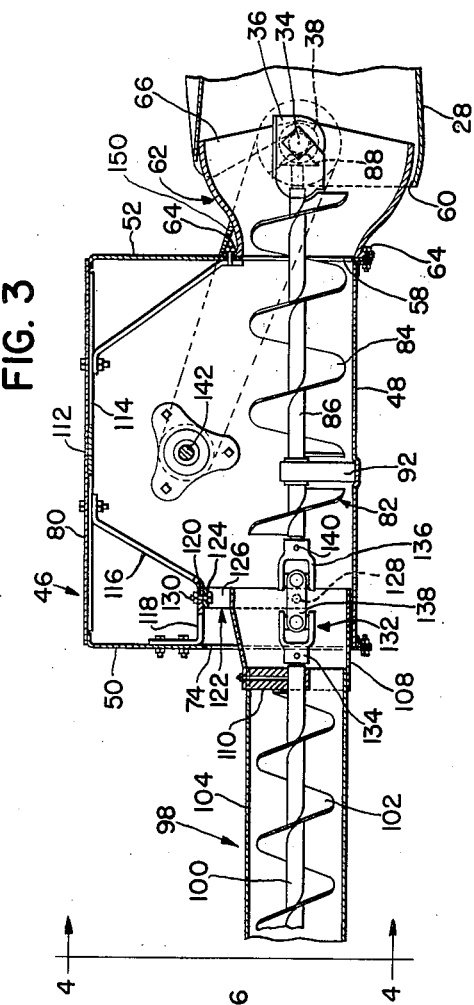
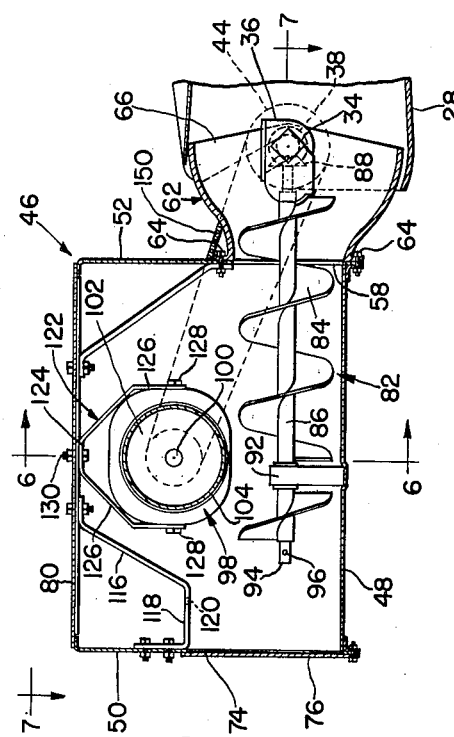
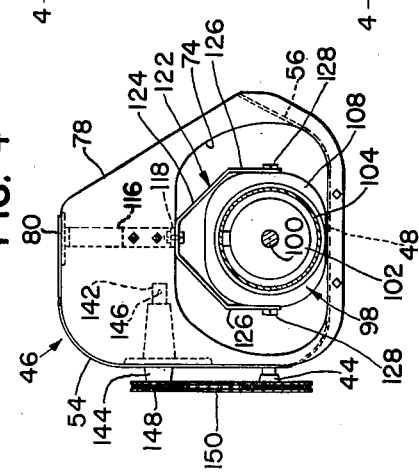
INVENTORS
MERRILL W. ROSCOE &
ROYAL L. BELDIN
BY
C.T. Parker and
ATTORNEYS Patented June 2, 1953

2,640,577

UNITED STATES PATENT OFFICE 2,640,577

HOPPER AND EXTENSION CONVEYER MECHANISM FOR SMALL GRAIN ELEVATORS

Merrill W. Roscoe, Moline, Ill., and Royal L. Beldin, Davenport, Iowa, assignors to Deere & Company, Moline, Ill., a corporation of Illinois Application October 3, 1949, Serial No. 119,366

19 Claims. (Cl. 198—9)

This invention relates to a hopper and extension conveyor mechanism for a small grain elevator. More particularly, the invention pertains to an improvement of the character specified especially adapted for use with grain elevators of the type used on farms for elevating or loading small grains from bins or piles into trucks or other receptacles.

A typical small grain elevator comprises a wheeled base which supports an elongated conveyor in an inclined position, the conveyor having its lower end adjacent the ground and adapted to receive material and its upper end at a level high enough to discharge material into trucks or equivalent receptacles. The lower or receiving end of the conveyor, commonly called the boot, is ordinarily equipped with a hopper or other material-receiving device having an inlet opening through which material is fed. In the usual case in which material is dumped directly from a truck or wagon to the hopper for elevation to a storage bin, there is no particular problem involved in getting the material into the hopper. However, in many instances, it is necessary to pick up the material from a pile on the ground or to withdraw the material from a storage bin. Because of limitations of space, for example, it is important that the hopper be equipped with an extension conveyor, usually in the form of an auger, for picking the material up from the pile or withdrawing it from the bin. It is also important that the extension conveyor be capable of positioning to extend laterally from the boot, or normal to the main conveyor, or to extend as an elongation of the main conveyor. It is of further importance that the extension conveyor or auger be mounted for relative angular adjustment within a limited range in either of its positions, particularly in the position in which it operates to pick up material from a pile on the ground, thereby eliminating the necessity for shoveling material into the auger.

According to the present invention, there is provided an improved hopper having opposite side walls, a floor or bottom, and opposite end walls. One end wall has an opening therein and is attached to the boot or housing of the conveyor and the hopper is provided with a short conveyor in the form of an auger for delivering material from the hopper to the main conveyor. The other end of the hopper is provided with a removable cover and the hopper further has an opening in the side thereof. The extension conveyor is positionable in a first position to feed material into the side opening or, alternatively, to feed material into the end opening after the removable cover has been taken off. Therefore, material may be fed to the hopper from a position alongside the elevator or from another position directly in line with the conveyor. It is a further feature of the invention to provide drive means enabling the extension conveyor to be driven from the power source of the conveyor regardless of the position in which it is used. A still further feature of the invention resides in providing the driving means so that it is readily adapted to be connected either to the end of the hopper auger or to a shaft especially provided for driving the extension conveyor when the extension conveyor is used in its lateral or transverse position.

Further objects and features of the invention reside in the provision of improved means for supporting the extension auger for angular positioning through a limited range in either of its main positions; and in the provision of flexible driving means in the drive connection to accommodate the adjustment of the extension auger.

The foregoing and other important objects and desirable features inherent in and encompassed by the invention will become apparent to those versed in the art as the disclosure is more fully made in the following detailed description and accompanying sheets of drawings, in which Figure 1 is a perspective view of a typical small grain elevator showing the extension conveyor or auger in its lateral or transverse position;

Figure 2 is a perspective view of the elevator structure of Figure 1, showing the extension auger in its second position as substantially an elongation of the main conveyor;

Figure 3 is an enlarged sectional view of the hopper construction and extension conveyor having the relative positions shown in Figure 2;

Figure 4 is an end view, as seen along the line 4—4 of Figure 3, of the hopper and extension auger;

Figure 5 is a longitudinal sectional view, similar to that shown in Figure 3, but illustrating the relationship of the hopper and extension auger on the basis of the relationship of these parts as depicted in Figure 1;

Figure 6 is a transverse sectional view taken on the line 6—6 of Figure 5; and

Figure 7 is a top plan view, partly in section, as viewed generally along the line 7—7 of Figure 5.

General elevator construction

The elevator structure shown in Figures 1 and 2 comprises a transverse axle 10 carried on a pair of wheels 12 to provide part of a movable or portable base for supporting an elongated conveyor structure 14 inclining from a lower material-receiving or boot end 16 to an upper or material-discharge end 18. The portable base further includes a reach 20 and a boom 22 which support the conveyor 14 in inclined position and provide for elevation or depression of the conveyor to dispose the discharge end 18 at various heights.

The conveyor structure illustrated is of the tubular type within which may be housed an elevator or conveyor of any suitable construction, such as the endless chain and paddle type (not shown). Such construction is well known to those versed in the art and need not be further illustrated. It will suffice to say that the conveyor extends from the lower end 16 to the upper end 18 of the conveyor structure 14 and functions to deliver material upwardly to the upper end 18 for ultimate discharge through a flexible spout 24.

In the present illustration, an internal combustion engine 26 is mounted at a lower end portion of the conveyor structure 14 for the purpose of supplying power to the endless conveyor within the tubular structure 14. It will be understood, of course, that any other suitable source of power may be utilized.

The lower end 16 of the conveyor structure 14 is provided as a boot or housing 28 within which may be located a shaft for driving the endless conveyor (not shown). Figures 1 and 2 show a shield 30 within which is enclosed an endless drive chain 32 (Figure 7) for transmitting power from the internal combustion engine 26 to other components of the elevator and hopper mechanism.

The details of the structure described above may vary according to individual desires and form no part of the present invention except in so far as they illustrate a typical type of elevator structure with which the invention may be used.

The boot or housing 28 carries power-transmitting means preferably in the form of a shaft 34 which extends transverse to the length of the conveyor 14. Within the housing 28 the shaft 34 is enclosed by a gear housing 36 which encloses a bevel pinion 38 keyed to the shaft 34. The bevel pinion provides a first driving element or portion. The shaft 34 is provided with a second driving portion or element comprising an external extension 40 thereof outside the housing 28. The shaft portion 40 has fixed thereto a first sprocket 42 about which the drive chain 32 is trained. Thus, the shaft 34 is powered by the internal combustion engine 26. The shaft portion 40 carries a second sprocket 44 which is keyed thereto and which provides a source of power for driving mechanism in the hopper, to be presently described.

Hopper construction

The hopper or material-receiving device is designated generally by the numeral 46. This hopper comprises essentially a box-like structure having a bottom wall or floor 48, first and second or opposite end walls 50 and 52, and first and second or opposite upright side walls 54 and 56.

The end wall 52 is positioned in proximity to the boot 28 and is provided with a material-transfer opening 58 (Figures 3 and 5). The hopper-proximate end of the boot or housing 28 is open at 60 and the two are interconnected in material-transfer relationship by an intermediate bell housing 62, which has one end secured at 64 to the hopper end wall 52 and its other end provided with opposite side portions 66 and 68 which are apertured on a transverse axis to respectively receive sleeve portions 70 and 72 on the gear housing 36 within the boot 28. The bell housing 62 is thus pivotally connected to the boot 28 and is rigidly connected to the hopper 46. Accordingly, the hopper is pivoted on a transverse axis (through the shaft 34) on the boot 28. The hopper is adapted to receive material and such material may be fed through the opening 58 and through the bell housing 62 to the boot 28. The particular shape of the bell housing 62 insures a relatively material-tight seal between the hopper 46 and boot or housing 28.

The opposite or outer end wall 50 of the hopper 46 is provided with an aperture or opening 74 in longitudinal alinement with the opening 58 in the other end wall 52 of the hopper. The opening 74 may be left open (Figures 2 and 3) to constitute a material-inlet opening, or may be closed by a removable cover means 76 (Figures 1 and 5). The hopper 46 is provided with a second material-inlet opening 78 (Figures 4, 6 and 7) defined by the peculiar relationship of the wall structure of the hopper. As best shown in Figure 6, the side wall 56 extends upwardly only to a level substantially at the top of the openings 58 and 74, whereas the opposite side wall 54 continues upwardly beyond this level and then extends toward the opposite side wall to provide a top wall 80. The top wall terminates just past a vertical plane passed through the axis of the openings 58 and 74. The end walls 52 and 50 are shaped to accommodate the shape of the continuous wall structure including the components 56, 48, 54 and 80. Thus, the material-inlet opening 78 is rectangular, as will best be seen in Figure 7.

It will be appreciated that the hopper structure thus far described need not be made of the particular configuration illustrated; although, that design has proved satisfactory in use and is convenient and economical to manufacture.

The hopper 46 carries material-advancing means or a conveyor in the form of a relatively short auger 82 comprising a helicoid 84 and a shaft 86. The auger 82 extends between the end walls 52 and 50 of the hopper and has a portion thereof extending through the opening 58 and into the bell housing 62. This end of the auger shaft 86 may be spoken of as the driven end and for this purpose it is provided with a driven element in the form of a bevel pinion 88 which is in constant mesh with the driving bevel pinion 38 on the transverse power shaft 34. For present purposes, the bell housing 62 may be considered part of the hopper 46, and the auger shaft 86 may be considered to be carried by the hopper 46.

An integral port 90 of the gear housing 36 provides a bearing for the driven end of the auger shaft 86. The opposite end portion of the auger shaft is supported on a bearing 92 rigidly carried by an intermediate portion of the floor or bottom wall 48 (Figures 3 and 5). The auger shaft 86 and approximately a half turn of the helicoid 84 are disposed at the side of the bearing 92 proximate to the opening 74 in the end wall 50. This end of the auger shaft 86 may be considered its driving end and is accordingly provided with a driving element 94, in the present case comprising a reduced portion of the shaft 86 which is provided with a diametrical opening 96 for the purpose of receiving a pin, as will presently appear.

From the description thus far, it will be seen that material entering the hopper 46 through either of the material-inlet openings 74 (where not covered) or 78 will be fed by the auger 82 through the bell housing 62 and into the boot 28, whence the material will be picked up by the conveyor structure within the tubular conveyor housing 14 and elevated to the discharge end 18 of the elevator. According to the present invention, improved and novel means is provided for feeding material selectively into either of the material-inlet openings 74 or 78. Part of this means will be described immediately below.

*Extension conveyor*

The extension conveyor here shown is in the form of an elongated auger 98 comprising a shaft 100 and a helicoid 102. One end of the auger 98 is provided with a generally cylindrical carrier 104 which covers only a short portion of the length of the auger. To this carrier is affixed an elongated arcuate shield 106 which extends substantially the length of the auger. In use, the under portion of the auger is exposed so that the auger is adapted to pick up material from a pile or from a storage bin. As will be appreciated by those versed in the art, the conventional storage bin is provided with a side opening into which an auger such as the auger 98 may be inserted.

The hopper-proximate end of the auger 98 is provided with a generally cylindrical extension 108, hereinafter called a carrier extension, which is rigidly fixed to the carrier 104 and which carries a bearing 110 for supporting the inner end of the auger shaft 100.

*Extension auger supporting means*

It will be evident from the disclosure thus far that the extension auger 98 may be used in either of two positions, shown respectively in Figures 1 and 2 in general. In the one position (Figure 1) the extension auger projects transversely at one side of the hopper 46, or normal to or at a right angle to the length of the conveyor 14. In its other position (Figure 2) the extension auger 98 projects generally as an elongation of the auger 82 in the hopper. For the purpose of supporting the extension auger selectively in either position, the hopper 46 is provided with a pair of supporting means. One of these comprises a vertical aperture 112 (Figure 3) formed in an intermediate portion of the top wall 80 and in a reenforcing member 114 secured to the top wall. The other supporting means comprises a bracket 116 rigidly secured at opposite ends to the top wall 80 and to the end wall 50 of the hopper and so shaped as to dispose a horizontal portion 118 thereof in the vicinity and near the top of the material-inlet opening 74. The bracket portion 118 is provided with a vertical aperture 120.

The hopper-proximate end of the extension auger 98 is provided with means cooperative with either of the supporting means 112 or 120. This means preferably comprises a support in the form of a yoke 122 having an upper or bight portion 124 and a pair of transversely spaced-apart legs 126. The legs 126 are pivotally connected respectively to opposite sides of the carrier extension 108, as at 128. The upper portion 124 of the yoke 122 is apertured and receives mounting or connecting means, here in the form of a bolt and nut assembly 130 which may be selectively carried by either the aperture 112 or the aperture 120 (in the top wall 80 or in the bracket 116, respectively). In either of its positions, the extension auger 98 is pivotally disposed for vertical swinging about the horizontal axis through the pivot connection 128 and is further horizontally swingable through the vertical pivot 130, whether the latter be connected at 112 or at 120. When the extension auger is disposed in its transverse position (Figure 1), the range of swinging is relatively wide, because of the elongated shape of the material-inlet opening 78. Likewise, the material-inlet opening 74 (Figure 4) is elongated so that the extension auger, in the position of Figure 2, may have horizontal swinging through a relatively wide arc.

*Driving means for extension conveyor*

The end of the extension auger shaft 100 proximate to the carrier extension 108 is provided with a driving connection by means of which the extension auger may derive power ultimately from the power source on the elevator.

This driving connection is designated generally by the numeral 132 (Figures 3 and 6) and comprises a flexible driving element made up of a double universal joint including a driven yoke 134, a driving yoke 136, and in intermediate connector 138 between the two yokes. The yoke 134 is permanently fixed to the hopper-proximate end of the auger extension shaft 100. The yoke 136 is socketed in such manner as to receive the end 94 of the hopper auger shaft 86 and is provided with an aperture through which a pin 140 may be passed. When the yoke 136 is connected to the end 94 of the hopper auger shaft 86, the pin 140 extends through the diametrical aperture 96 in the auger extension shaft (Figure 3).

As previously stated, the end 94 of the auger extension shaft 86 comprises one of a pair of driving elements or portions capable of selectively driving the extension auger, according to the position of the latter. The other driving element or portion comprises a stub shaft 142 journaled in a bearing 144 fixed to the hopper side wall 54. The axis of the shaft 142 is transverse or normal to the axis of the auger shaft 86 and the shaft 142 is disposed at a level above the top or other portion of the auger 82. In other words, the shaft 142 is proximate to or in alinement with the material-inlet opening 78. It will be remembered that the upper edge of the hopper side wall 56 terminates substantially at the level of the top of the auger 82. In so far as the two driving elements 94 and 142 are concerned, their axes are transverse to each other and when projected would extend respectively through the material-inlet openings. Stated otherwise, the material-inlet opening 74 is coaxial with the auger 82 and hence is coaxial with the auger driving element 94; similarly, the material-inlet opening 78 is substantially coaxial with the inner end of the stub shaft 142.

The inner end of the stub shaft has a diametrical aperture 146 which is capable of receiving the pin 140 so that the yoke 136 of the driving connection 132 may be pinned thereto when the extension auger is in the position shown in Figures 1, 5, 6 and 7.

The stub shaft 142 extends through the hopper side wall 54 to the exterior of the hopper and has keyed thereto a sprocket 148. A driving chain 150 is trained about this sprocket and about the sprocket 44 on the power-transmitting shaft 40.

Summary

The extension auger 98 is selectively positionable to deliver material to either of the material-inlet openings 74 or 78. In either case, the extension auger is supported at its inner or hopper-proximate end by the supporting means comprising the yoke 122. In one case, the yoke 122 is supported at 112 and in the other case the yoke is supported at 120. In either position, the extension auger is swingable in a vertical arc about the pivot axis through 128 and is swingable in a horizontal arc about the vertical axis through 130. The flexible drive connection 132 accommodates this relative angularity of the extension auger with respect to either the hopper auger 82 or the stub shaft 142. Hence, the single material-receiving device comprising the hopper 46 is capable of receiving material from an extension feeder or conveyor (the extension auger 98) while the latter is in a variety of positions. Limitations of space or surrounding structures often require that the elevator be maneuvered to its most advantageous position. According to the present invention, the elevator may remain stationary and the change may be made by positioning the extension auger in one or the other of its positions. The two separate drive means 94 and 142 cooperate with the extension auger regardless of its position. The supporting structure for the inner end of the extension auger is simple in construction and is readily assembled and disassembled to permit change of position of the extension auger. When the auger is utilized as in Figure 1, it is merely necessary to close the material-inlet opening 34 by the removable cover 76. Hence, the hopper 46 becomes a material-transfer point for the feeding of material along angularly related paths. Considered broadly, the hopper 46 is made up of a plurality of angularly related wall portions, in which the material-inlet openings and the material-outlet opening 58 are similarly angularly related. The driving elements comprising the part 94 on the auger shaft 86 and the stub shaft 142 are associated with the angular relationship of the material-inlet openings to accommodate the different angular positions of the extension auger. A further feature of the invention is the construction of the hopper 46 and its associated parts, the design of which is arranged so that the hopper may be utilized with elevators of existing types.

Other important features of the invention not enumerated above will undoubtedly occur to those versed in the art, as likewise will numerous modifications and alterations in the preferred form of the invention illustrated, all of which may be achieved without departing from the spirit and scope of the invention as defined in the appended claims.

What is claimed is:

1. A material-handling hopper having a bottom wall, first and second upright end walls, and first and second upright side walls; means providing an aperture in the first end wall near the bottom thereof; an auger rotatably carried by the hopper and extending horizontally between the end walls and in proximity to the bottom wall and coaxial with said aperture for advancing material toward said aperture, said auger having a driven end portion adjacent said aperture and a driving end portion adjacent the second end wall; means providing an aperture in the second end wall coaxial with the auger; a removable cover for said second end wall aperture; said first side wall extending upwardly beyond the top of the auger, and said second side wall having a material-inlet opening above the level of the top of the auger; a driving member rotatably carried by the first side wall above the level of the top of the auger and coaxial with the material-inlet opening on an axis normal to the auger axis, said driving member having a driving end facing the material-inlet aperture; and an extension auger selectively positionable to extend through the material-inlet opening and coaxial with the driving member, or to extend through the uncovered aperture in the second end wall and coaxial with the first mentioned auger, said extension auger having a driven end selectively connectible to the driving end of the driving member or to the driving end of the first mentioned auger, according to the position of said extension auger.

2. The invention defined in claim 1, further characterized in that: the extension auger has a carrier adjacent its driven end; the hopper is provided with a pair of supports; and the carrier has means selectively connectible to either of said supports for sustaining of the extension auger in either of its positions.

3. The invention defined in claim 2, further characterized in that: said supports comprise a first pivot element adjacent the driving end of the driving member and a second pivot adjacent the driving end of the first mentioned auger; the connectible means includes a pivot element on the carrier selectively connectible with either of the aforesaid pivot elements, according to the position of the extension auger, to provide for angular adjustment of the extension auger; and the driven end of the extension auger includes a flexible drive element to accommodate such angular adjustment.

4. The invention defined in claim 3, further characterized in that: said first pivot element is on a vertical axis and above the driving end of the driving member and said second pivot element is on a vertical axis and above the driving end of the first mentioned auger; and the connectible means comprises a yoke mounted on the carrier and the pivot element thereon is on a vertical axis and is selectively suspendable from either of the aforesaid pivot elements, according to the position of the extension auger, to provide for angular adjustment of the extension auger.

5. A material-handling hopper having a bottom wall, first and second upright end walls, and first and second upright side walls; means providing an aperture in the first end wall near the bottom thereof; a conveyor extending horizontally between the end walls and over the bottom wall and in alinement with said aperture to advance material in a path toward said aperture; said conveyor having a driven portion adjacent said aperture and a driving portion adjacent the second end wall; means providing an aperture in the second end wall in alinement with the conveyor; a removable cover for said second end wall aperture; said first side wall extending upwardly beyond the top of the conveyor; and said second side wall having a material-inlet opening above the level of the top of the conveyor; a driving member carried by the first wall in alinement with the material-inlet opening on a line transverse to the path of feeding of the conveyor, said driving member having a driving portion facing the material-inlet opening; and an extension conveyor selectively positionable to extend transverse to the path of feeding of the first mentioned conveyor and in communication with the material-inlet opening, or to extend as a continuation of the first mentioned conveyor in communication with the aperture in the second end wall, said extension conveyor having a driven portion selectively connectible to either of the aforesaid driving portions according to its position.

6. A material-handling device, comprising: a normally horizontally positionable trough having side walls and opposite, first and second open ends; an auger rotatably carried in the trough for moving material out through the first end and having a driven portion at said first end and a driving portion at the second end; a driving member rotatably carried by the trough intermediate the ends of the auger; an extension auger positionable selectively in a first position above the trough and transverse to and above the first auger for delivering to the trough, or in a second position in alinement with and as an extension of the first auger through the second end of the trough; a removable cover for closing the second end of the trough when the extension auger is used in its first position, and removable when the extension auger is used in its second position; a drive element at the trough-proximate end of the extension auger selectively connectible to the driving member when the extension auger is used in its first position or to the driving portion of the first auger when the extension auger is used in its second position; and means on the extension auger cooperative with the trough for supporting the extension auger in either of its positions.

7. A material-handling hopper having a bottom wall, first and second upright end walls, and first and second upright side walls; means providing an aperture in the first end wall near the bottom thereof; an auger rotatably carried by the hopper and extending horizontally between the end walls and in proximity to the bottom wall and coaxial with said aperture for advancing material toward said aperture, said auger having a driven end portion adjacent said aperture and a driving end portion adjacent the second end wall; means providing an aperture in the second end wall coaxial with the auger; a removable cover for said second end wall aperture; said first side wall extending upwardly beyond the top of the auger, and said second side wall having a material-inlet opening above the level of the top of the auger; and a driving member rotatably carried by the first side wall above the level of the top of the auger and coaxial with the material-inlet opening on an axis normal to the auger axis, said driving member having a driving end facing the material-inlet aperture.

8. A material-handling hopper having a bottom wall, first and second upright end walls, and first and second upright side walls; means providing an aperture in the first end wall near the bottom thereof; a conveyor extending horizontally between the end walls and over the bottom wall and in alinement with said aperture to advance material in a path toward said aperture, said conveyor having a driven portion adjacent said aperture and a driving portion adjacent the second end wall; means providing an aperture in the second end wall in alinement with the conveyor; a removable cover for said second end wall aperture; said first side wall extending upwardly beyond the top of the conveyor, and said second side wall having a material-inlet opening above the level of the top of the conveyor; and a driving member carried by the first wall in alinement with the material-inlet opening on a line transverse to the path of feeding of the conveyor, said driving member having a driving portion facing the material-inlet opening.

9. A grain elevator, comprising: an elongated, inclined conveyor having a lower, material-receiving end and an upper, discharge end; a material-receiving hopper at the inlet end and having a first material-inlet opening at one side thereof for receiving material along a path transverse to the conveyor, and further having a second material-inlet opening generally alined with the conveyor for receiving material along a path that is substantially an extension of the conveyor; a power source adjacent the lower end of the conveyor; first and second driving elements carried by the hopper and connected to the power source, and disposed respectively in alinement with the first and second material-inlet openings; and an extension conveyor positionable to extend transversely of the conveyor and to communicate with the hopper via the first material-inlet opening, or to extend as a continuation of the conveyor and to communicate with the hopper via the second material-inlet opening, said extension conveyor having a drivable element selectively connectible to the first driving element in one position or to the second driving element in its other position.

10. A grain elevator, comprising: an elongated, inclined conveyor having a lower, material-receiving housing and an upper, discharge end; a power shaft rotatably carried by said lower end housing on an axis transverse to the extent of the conveyor, said shaft projecting at one side of the housing to provide a first driving element outside the housing and further having an intermediate portion providing a second driving element within the housing; a material-receiving hopper positioned adjacent the housing and having an opening in material-transfer relationship with the housing; an auger rotatably carried within the hopper and disposed generally as an elongation of the conveyor for feeding material to the housing through said opening, and having at one end thereof a driven element connected to the second driving element of the power shaft and having a driving element at its opposite ends; means providing a first materially-inlet opening in the hopper intermediate the ends of the auger; means providing a second material-inlet opening in the hopper adjacent the driving element end of the auger; an extension conveyor positionable in a first position to extend from the first material-inlet opening and laterally as respects the auger, or in a second position to extend from the second material-inlet opening generally as an elongation of the auger; and drive means for driving the extension conveyor selectively from the first driving element of the power shaft when said extension conveyor is used in its first position, or from the driving element of the auger when said extension conveyor is used in its second position.

11. A grain elevator, comprising: an elongated, inclined conveyor having a lower, material-receiving housing and an upper, discharge end; a power shaft rotatably carried by said lower end housing and having first and second driving elements; a material-receiving hopper positioned adjacent the housing and having an opening in material-transfer relationship with the housing; a secondary conveyor carried within the hopper and disposed generally as an elongation of the conveyor for feeding material to the housing through said opening, and having at one end thereof a driven element connected to the second driving element of the power shaft and having a driving element at its opposite end; means providing a first material-inlet opening in the hopper intermediate the ends of the secondary conveyor; means providing a second material-inlet opening in the hopper adjacent the driving element end of the secondary conveyor; an extension conveyor positionable in a first position to extend from the first material-inlet opening and laterally as respects the secondary conveyor, or in a second position to extend from the second material-inlet opening generally as an elongation of the secondary conveyor; and drive means for driving the extension conveyor selectively from the first driving element of the power shaft when said extension conveyor is used in its first position, or from the driving element of the secondary conveyor when said extension conveyor is used in its second position.

12. In a grain elevator having an elongated conveyor inclining upwardly from a lower, material-receiving end to an upper, material-discharge end, the improvement comprising: means including a housing at the lower end of the conveyor and in material-transfer relationship with said lower end; a material-receiving hopper positioned in material-transfer relationship with the housing and having a pair of spaced apart material-inlet openings; power-transmitting means in the housing having a first driving portion within the housing and a second driving portion outside the housing; an extension conveyor selectively positionable with respect to the hopper in a first position to feed material into one of said material-inlet openings or in a second position to feed material into the other of said material-inlet openings; and means for drivingly connecting the extension conveyor selectively to the first or second driving portions of the power-transmitting means, respectively, according to whether the extension conveyor is in its first or second position.

13. In a grain elevator having an elongated conveyor inclining upwardly from a lower, material-receiving end to an upper, material-discharge end, the improvement comprising: means including a housing at the lower end of the conveyor and in material-transfer relationship with said lower end; a material-receiving hopper positioned in material-transfer relationship with the housing and having a pair of spaced apart material-inlet openings; a power shaft rotatably carried in the housing and having a first driving portion within the housing and a second driving portion outside the housing; first and second separate driving elements in the hopper, one connected to said first driving portion, and the other extending outside the hopper and connected to said second driving portion; an extension conveyor selectively positionable to feed material into one or the other of the material-inlet openings; and driven means on the extension conveyor selectively connectible in driving relationship with the first driving element when positioned to feed into one material-inlet opening, or with the second driving element when positioned to feed into the other material-inlet opening.

14. The invention defined in claim 13, further characterized in that: said first driving element includes an auger extending into proximity to one material-inlet opening; said second driving element includes a stub shaft having an end interiorly of the hopper and proximate to the other material-inlet opening and an opposite end exteriorly of the hopper and connected to said second driving portion; and said driven means on the extension conveyor is selectively connectible to the aforesaid end of the auger or to the interior end of said stub shaft.

15. In a grain elevator of the character described having an elongated conveyor inclining upwardly from a lower, material-receiving end to an upper, material-discharge end, and further having a power-transmitting means, the improvement comprising: a hopper having a pair of material-inlet openings and a material-outlet opening and positionable at the lower end of the conveyor with said material-outlet opening in material-transfer relationship with said lower end; an extension feeder, having a driven part, selectively positionable and supportable on the hopper in either of two positions to feed material to either of said material-inlet openings; and means carried by the hopper for connection to the power-transmitting means of the conveyor and selectively connectible to the extension feeder driven part in either position of said extension feeder.

16. A material-receiving hopper comprising a plurality of angularly related wall portions; means providing a material-outlet opening in one wall portion; means providing a first material-inlet opening in another wall portion angularly related to the wall portion having the material-outlet opening; means providing a second material-inlet opening in another wall portion angularly related to the wall portions having the aforesaid openings; a first drive shaft rotatably mounted in the hopper and having a drive-connectible end portion proximate to the first material-inlet opening; and a second drive shaft rotatably mounted in the hopper apart from the first shaft and having a drive-connectible end proximate to the second material-inlet opening.

17. The invention defined in claim 16, further characterized in that: the axes of the drive shafts are angularly related and the shafts and material-inlet openings are so arranged that the projected axes of the shafts extend respectively through said material-inlet openings.

18. A material-receiving hopper for use with an elevator having a power source and with a two-position extension feeder of the character described having a driven part, comprising: a plurality of wall portions, one of said wall portions having a material-outlet opening for connection in material-transfer relation to the elevator, and a pair of other wall portions respectively having material-inlet openings selectively communicable with such extension feeder in either of its two positions; a pair of means on the hopper respectively proximate to said material-inlet openings for supporting such extension feeder respectively in its two positions; and a pair of separate driving elements respectively having separate means for connection to the elevator power source, and each having means independently of the other for connection to the driven part of the extension feeder.

19. A material-handling device, comprising: a normally horizontally positionable trough having side walls and opposite, first and second open ends, said first end serving as a first material-discharge opening; an auger rotatably carried in the trough for moving material from the first end toward and out through the second end and having a driven portion at said first end for connection to a source of input power and a driving portion at the second end serving as a first power output member for driving an external conveyor; means in the trough providing a second material-discharge opening intermediate the ends of the trough and leading in a direction transverse to the auger; and a driving member rotatably carried by the trough intermediate the ends of the auger and having a driven portion for connection to a source of input power and a driving portion similar to the driving portion of the auger and serving as an alternate power output member connectible to an external conveyor.

MERRILL W. ROSCOE.
ROYAL L. BELDIN.

References Cited in the file of this patent

UNITED STATES PATENTS

| Number | Name | Date |
|---|---|---|
| 1,170,445 | Hartley | Feb. 1, 1916 |
| 1,746,649 | Hancock | Feb. 11, 1930 |
| 2,237,200 | Sloan | Apr. 1, 1941 |